(12) United States Patent
Murphy et al.

(10) Patent No.: US 9,954,569 B2
(45) Date of Patent: Apr. 24, 2018

(54) ELASTIC SECURING APPARATUS AND MOUNTING SYSTEM FOR ELECTRONIC DEVICE

(71) Applicant: Johnny Rhymes with Connie, LLC, Roseville, MN (US)

(72) Inventors: John A Murphy, Roseville, MN (US); Connie R Rutledge, Roseville, MN (US)

(73) Assignee: Johnny Rhymes with Connie LLC, Roseville, MN (US)

( * ) Notice: Subject to any disclaimer, the term of this patent is extended or adjusted under 35 U.S.C. 154(b) by 292 days.

(21) Appl. No.: 14/988,456

(22) Filed: Jan. 5, 2016

(65) Prior Publication Data

US 2016/0134733 A1 May 12, 2016

Related U.S. Application Data

(63) Continuation-in-part of application No. 14/836,766, filed on Aug. 26, 2015, now Pat. No. 9,259,077,
(Continued)

(51) Int. Cl.
*H04B 1/38* (2015.01)
*H04B 1/3888* (2015.01)
(Continued)

(52) U.S. Cl.
CPC .............. *H04B 1/3888* (2013.01); *A45F 5/00* (2013.01); *F16M 13/00* (2013.01); *F16M 13/04* (2013.01);
(Continued)

(58) Field of Classification Search
CPC ...... H04B 1/3877; H04B 1/38; H04B 1/3822; H04B 1/3888; H04B 2001/3861;
(Continued)

(56) References Cited

U.S. PATENT DOCUMENTS

| 1,689,787 A | 10/1928 | Kupferschmid |
| 6,266,685 B1 | 7/2001 | Danielson et al. |

(Continued)

OTHER PUBLICATIONS

International Preliminary Report on Patentability from international counterpart application No. PCT/US17/12183, dated Mar. 17, 2107, 14 pp.
(Continued)

*Primary Examiner* — Corey Skurdal
(74) *Attorney, Agent, or Firm* — Grumbles Law PLLC; Brittany Nanzig

(57) ABSTRACT

A two-part mounting system for easier and more secure transport of a mobile phone or other hand-held electronic device comprising a handle and complementary receiving mount. More specifically, the handle is comprised of a base, a flexible strap, and an adhesive backer, and the complementary mount is dome-shaped and comprised of a rounded top, a slot for receiving the flexible strap, and a bottom for receiving the base. The handle and complementary mount physically interlock by virtue of the shape of the base and receiving mount and the tension of the flexible strap around the complementary mount. The two-part mounting system can then securely attach the electronic device to an additional fixed or mobile mount.

20 Claims, 13 Drawing Sheets

Related U.S. Application Data which is a continuation-in-part of application No. 14/251,146, filed on Apr. 11, 2014, now abandoned, which is a continuation-in-part of application No. 29/453,073, filed on Apr. 24, 2013, now Pat. No. Des. 735,695, which is a continuation of application No. 13/481,581, filed on May 25, 2012, now abandoned.

(60) Provisional application No. 62/100,055, filed on Jan. 5, 2015, provisional application No. 61/490,516, filed on May 26, 2011.

(51) Int. Cl.
| | | |
|---|---|---|
| *A45F 5/00* | (2006.01) | |
| *F16M 13/00* | (2006.01) | |
| *F16M 13/04* | (2006.01) | |
| *H04B 1/3877* | (2015.01) | |
| *H04M 1/04* | (2006.01) | |
| *H04B 1/3827* | (2015.01) | |

(52) U.S. Cl.
CPC . *A45F 2005/008* (2013.01); *A45F 2200/0516* (2013.01); *H04B 1/3877* (2013.01); *H04B 2001/3861* (2013.01); *H04M 1/04* (2013.01)

(58) Field of Classification Search
CPC ........ H04M 1/00; H04M 1/02; H04M 1/0279; H04M 1/04; H04M 1/06; A45F 5/00; A45F 5/02; A45F 2005/023; A45F 2200/0508; A45F 2200/0516; A45F 2200/0525; A45F 2200/0533; F16M 13/00; F16M 13/04
See application file for complete search history.

(56) References Cited

U.S. PATENT DOCUMENTS

| | | | |
|---|---|---|---|
| 6,360,928 B1 | 3/2002 | Russo | |
| 6,397,046 B1 | 5/2002 | Kfoury | |
| 7,464,814 B2 | 12/2008 | Carnevali | |
| 7,780,047 B2 | 8/2010 | Chen et al. | |
| D633,504 S | 3/2011 | Alexander, Jr. | |
| D642,579 S | 8/2011 | Deutsch | |
| 8,328,055 B1 * | 12/2012 | Snyder | A45F 5/00 224/197 |
| 8,550,317 B2 * | 10/2013 | Hyseni | A45F 5/00 224/197 |
| 8,662,362 B1 * | 3/2014 | Bastian | H04B 1/3888 224/197 |
| 8,783,533 B1 * | 7/2014 | Marseille | H04B 1/385 224/197 |
| 8,939,483 B2 | 1/2015 | Kim | |
| 9,204,710 B1 * | 12/2015 | Burns | A45F 5/00 |
| 2003/0066856 A1 | 4/2003 | Lehtonen | |
| 2004/0013279 A1 | 1/2004 | Takeda | |
| 2005/0205623 A1 | 9/2005 | Buntain | |
| 2006/0054704 A1 | 3/2006 | Fitch et al. | |
| 2008/0083797 A1 | 4/2008 | Myers | |
| 2008/0203127 A1 | 8/2008 | Castillo-Garrison | |
| 2009/0090750 A1 | 4/2009 | Alcenat | |
| 2009/0321483 A1 | 12/2009 | Froloff | |
| 2010/0116387 A1 | 5/2010 | Channey et al. | |
| 2010/0171021 A1 | 7/2010 | Smith | |
| 2010/0222118 A1 | 9/2010 | Interdanato | |
| 2010/0264182 A1 | 10/2010 | Perlman et al. | |
| 2010/0327030 A1 * | 12/2010 | Yang | A45F 5/00 224/199 |
| 2011/0034221 A1 | 2/2011 | Hung et al. | |
| 2011/0279959 A1 * | 11/2011 | Lopez | A45F 5/00 361/679.03 |
| 2012/0063066 A1 | 3/2012 | Floit | |
| 2012/0299318 A1 | 11/2012 | Murphy et al. | |
| 2013/0299365 A1 * | 11/2013 | Andrew | A45C 13/002 206/37 |
| 2015/0365125 A1 | 12/2015 | Murphy et al. | |

OTHER PUBLICATIONS

Flygrip, Inc.; Flygrip; product launched summer 2011; accessed Aug. 27, 2012, at http://flygrip.com/.

Scott Paul Technologies; CellHandle Innovative Phone Accessory; CellHandle; May 16, 2011; accessed Aug. 27, 2012, at http://www.scottpaultech.com/index.html.

Kernelope Enterprises, LLC; Lazy-Hands Thumbs-Free Grip for Mobile Devices; May 2011; access Aug. 27, 2012, at http://www.lazy-hands.com/.

Stephen A Vu; Non-Final Office Action for U.S. Appl. No. 13/481,581; USPTO Communication; dated Jan. 24, 2013.

Corey Nelson Skurdal; Non-Final Office Action for U.S. Appl. No. 14/251,146; USPTO Communication; dated Sep. 25, 2014.

Corey Nelson Skurdal; Final Office Action for U.S. Appl. No. 14/251,146; USPTO Communication; dated Mar. 26, 2015.

* cited by examiner

ELASTIC SECURING APPARATUS AND MOUNTING SYSTEM FOR ELECTRONIC DEVICE

CROSS-REFERENCE TO RELATED APPLICATIONS

This application claims the benefit of U.S. Provisional Application Ser. No. 62/100,055, filed on Jan. 5, 2015, titled FLEXIBLE FINGER STRAP AND SURFACE MOUNT FOR ELECTRONIC DEVICE and is a continuation-in-part of U.S. patent application Ser. No. 14/836,766, filed on Aug. 26, 2015, titled ELASTIC SECURING APPARATUS AND MOUNTING SYSTEM FOR ELECTRONIC DEVICE, which is a continuation-in-part of U.S. patent application Ser. No. 14/251,146, filed on Apr. 11, 2014, titled FLEXIBLE FINGER STRAP AND SURFACE MOUNT FOR ELECTRONIC DEVICE, which is a continuation-in-part of U.S. Pat. No. 735,695, filed on Apr. 24, 2013, titled ELASTIC FINGER STRAP AND BASE and patented on Aug. 4, 2015, which is a continuation of U.S. patent application Ser. No. 13/481,581, filed May 25, 2012, titled ELASTIC FINGER STRAP AND SURFACE MOUNT FOR ELECTRONIC DEVICE, which claims the benefit of U.S. Provisional Application Ser. No. 61/490,516, filed on May 26, 2011, titled ELASTIC FINGER STRAP AND SURFACE MOUNT FOR ELECTRONIC DEVICE.

FIELD OF THE DISCLOSURE

The present disclosure relates to a two-part mounting system for handheld electronics comprising a handle comprised of a base, a strap, and an adhesive backer, the handle being affixed to an electronic device, and a complementary shaped receiving mount. The handle and receiving mount physically interlock by virtue of the shape of the base and complementary mount and the tension of the elastic of the strap around the complementary mount. The two-part mounting system can then securely attach the electronic device to an additional fixed or mobile mount.

BACKGROUND OF THE INVENTION

As smart phone and tablet computers become more prevalent, the need for an ergonomic handle and a convenient, secure way of mounting these devices has become apparent. Millions of dollars are spent on repairs to phones due to accidental damage each year. Many accessories for these devices are designed to protect the device from damage incurred from dropping the device, but few provide the user with a better grip or reduce the likelihood of dropping the device. Further, none provide a better grip while in the users hands and a way of firmly securing the device so that the user may operate the device in a "hands-free" fashion.

Currently, several mounting systems are available for smartphones and other electronic devices. Methods typically employed for securing a device to a mount include clamps, magnets, or sticky pads. However, clamping the device on its edges, between two surfaces, results in limited accessibility to the buttons typically placed around the periphery of the device. Additionally, a portion of the clamp typically protrudes beyond the plane of the screen of the device, again limiting access to the control screen. Clamps are also limited in the range that they can open and close, making them incompatible with some devices, and they create a physical challenge when engaging a device that is difficult to overcome with one hand. Magnetic mounts are easier to operate with one hand and require little physical dexterity in connecting the device to the mount. However, magnetic mounts do not offer a physical capture of the device, which makes the device more susceptible to being knocked off the mount by shock or vibration.

Therefore, a complementary accessory and mounting system is needed that enhances a user's grip on an electronic device, that enables a user to easily connect the device to a mount that physically captures the device, and that permits the user to maintain physical dexterity and access the device's periphery buttons.

SUMMARY OF THE INVENTION

An objective of the present invention is to provide a strong, low profile, device-agnostic, secure handle apparatus to assist in the holding and use of mobile electronics. The handle can be easy to install directly to a handheld device or to a protective case for said device. The handle can be used ambidextrously and can require little dexterity to use. Further, it is minimally intrusive, adding little, if any, to the external dimensions, and it allows the user to store the electronic device in pockets and purses with ease.

In one aspect, the disclosed handle includes a flexible strap that is adhered at both ends to a singular, rigid base that is, in turn, strongly adhered to the back of a handheld electronic device or protective case, which provides the user of said device a means to hold the electronic device securely by inserting one or more fingers into the opening between the strap and base.

The strap can be flexible enough to allow a user to hold the device in a variety of ways, making it more practical and ergonomic to use while decreasing the risk that the user will drop the device. The flexible strap is attached to the bottom of the base through receiving channels that are approximately as deep as the thickness of the flexible strap. Therefore, when the flexible strap is adhered to the base, the surface of the flexible strap along the bottom of the base is approximately in the same plane of the bottom of the base, providing a contiguous surface for adhesively bonding the base to the device.

An additional objective of the present invention is to provide a complementary mounting system to the handle, wherein the mounting system interfaces directly with the flexible strap and base of the handle and enables the user to secure the handheld device to a surface for 'hands-free' usage.

In some embodiments, the mount system is comprised of a complementary receiving mount that interacts with the handle and handheld device and an attachment apparatus that securely fastens the complementary receiving mount to a variety of surfaces and structures such as, but not limited to, selfie sticks, bicycle handle bars, automobile dashboards, cup holders, or air vents.

DETAILED DESCRIPTION

The exemplary embodiments described herein in detail for illustrative purposes are subject to many variations in structure and design. It should be emphasized, however, that the present disclosure is not limited to a particular strap, base, and mount, as shown and described. It is understood that various omissions and substitutions of equivalents are contemplated as circumstances may suggest or render expedient, but these are intended to cover the application or embodiments without departing from the spirit or scope of the claims of the present disclosure. Also, it is to be understood that the phraseology and terminology used herein are for the purpose of description and should not be regarded as limiting.

The use of "including," "comprising," or "having" and variations thereof herein is meant to encompass the items listed thereafter and equivalents thereof as well as additional items. Further, the terms, "a" and "an" herein do not denote a limitation of quantity, but rather denote the presence of at least one of the referenced item. Unless limited otherwise, the terms "attached," "coupled," and variations thereof herein are used broadly and encompass direct and indirect attachments and couplings.

Figure 1:
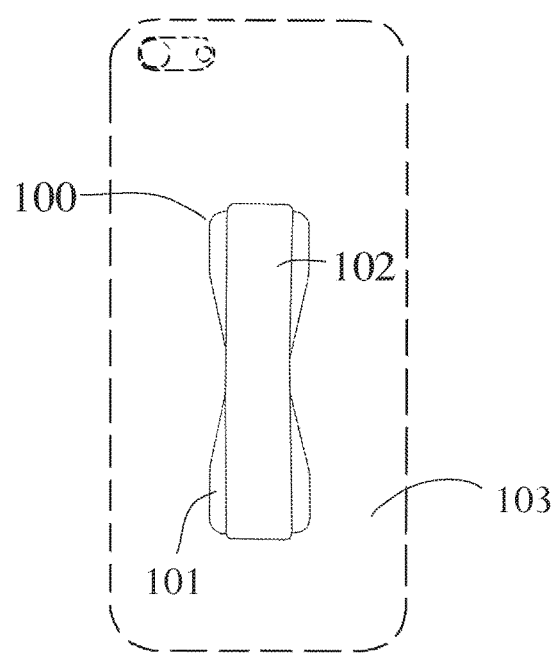
FIG. 1 is a top view of the handle attached to a device according to one embodiment of the present invention.

In one embodiment, as shown in FIG. 1, the disclosed invention includes a sleek, adhesive handle apparatus 100. The disclosed handle 100 can include a flexible strap 102 having two ends that are adhered to the bottom of a singular base 101 that is, in turn, capable of strongly adhering to the back of a handheld, electronic device 103 using an adhesive. The flexible strap 102, in some embodiments, can span the length of the base 101. The handle 100 provides a user of the electronic device 103 with means to hold the device 103 securely by inserting one or more fingers into an opening between the flexible strap 102 and the base 101.

Figure 2:
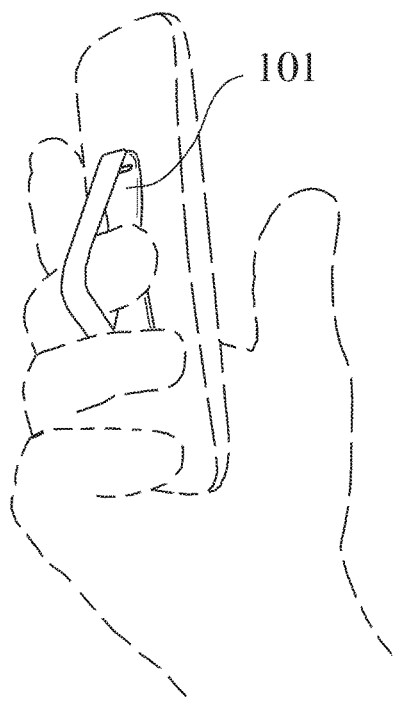
FIG. 2 is a perspective view of the handle of FIG. 1 in use according to one embodiment of the present invention.

FIG. 2 demonstrates use of the handle 100 when the flexible strap 102 and base 101 are attached to an electronic device 103 and held in a user's hand. One or more fingers, as shown in FIG. 2, can be inserted through the aperture created by the flexible strap 102 being firmly attached to both ends of the base 101. The base 101 and flexible strap 102 may be made to different lengths and widths to accommodate different mounting apparatuses or appendages. In some embodiments, the handle 100 may be integrated with the case of the electronic device or the handle 100 may take the form of a protective case for a mobile phone.

Figure 3:
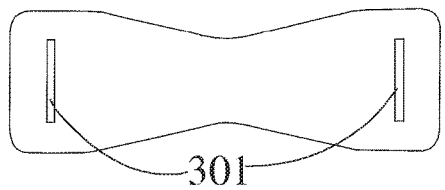
FIG. 3 is a bottom view of the base according to one embodiment of the present invention.
Figure 4:
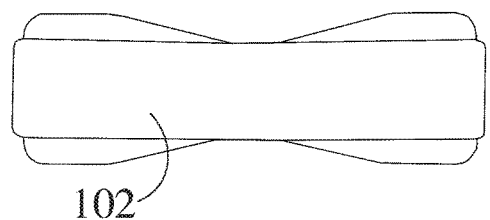
FIG. 4 is a top view of the handle of FIG. 1 according to one embodiment of the present invention.

The base 101 can tautly secure both ends of the flexible strap 102 such that the flexible strap 102 lies substantially flat to the top of the base 101. In some embodiments, the base 101 can have a uniform width from one end to the other. In other embodiments. the base 101 can be wider at its ends to encompass the full width of the flexible strap 102 and, in the middle, can be narrower than the flexible strap 102 such that the edges of the taut, flexible strap 102 protrude past the edges of the base 101 and maintain a distance from the back of the electronic device 103 approximately equal to the thickness of the base 101. This gap makes it easy for users to insert fingers between the base 101 and flexible strap 102 or to slide the handle 100 onto a mount using minimal dexterity. Therefore, as described above and illustrated in FIGS. 1, 3-4, and 6, the base 101 can narrow at least once in the middle to create the aforementioned gap. For example, the base 101 can take the general shape of a bow tie, wherein a first and second end of the base are wider than the middle. FIG. 3 depicts the hourglass like shape of the base 101 with two mortises 301 that are designed to accept protrusions from a mounting apparatus. The mortises 301 can be located on the ends of the base 101 or at other locations along the base 101 and can create a pass-through when they extend the entire depth of the base 101. In some embodiments, the base 101 can narrow at a location other than at its middle or can narrow more than once.

Figure 5:
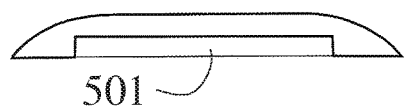
FIG. 5 is a left side view of the base according to one embodiment of the present invention; the right side view is a mirror image of the left side view.

In some embodiments, the periphery of the base 101 can be tapered to create a sleek look and feel and to facilitate the insertion of fingers or a mounting apparatus. For example, the edge of the base 101 can be rounded and tapered toward the bottom surface of the base 101, as shown in FIG. 5, to create a smooth and sleek feel for the user and to prevent the electronic device 103 from becoming caught on clothing, pockets, and the like. The distinctive beveled edge of the base 101, particularly in the narrow portion of the base 101, creates a unique ergonomic grip for the user, such that when the user's finger is inserted between the flexible strap 102 and base 101 and the narrow portion of the base 101 is proximal to one of the user's finger joints, the attached electronic device 103 will not fall from the users hands. The narrowing of the base 101 and tapering of the edge of the base 101 together provide a functional gap between the back of the electronic device 103 and the flexible strap 102 for the effortless insertion of fingers and mounting apparatuses.

Figure 6:
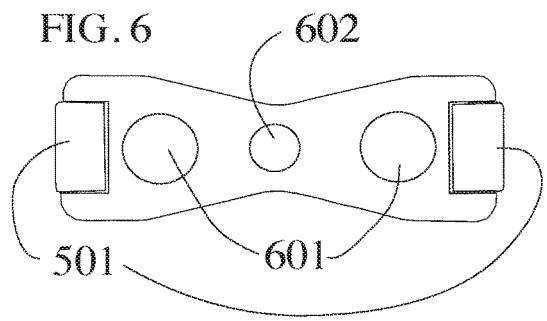
FIG. 6 is a bottom view of the base according to one embodiment of the present invention.

In some embodiments, the base 101 can provide a secure anchor for both ends of the flexible strap 102 in the form of receiving channels 501. The receiving channels 501 can be located on the bottom of the base 101, as depicted in FIGS. 5 and 6, and each end of the flexible strap 102 can adhere to a receiving channel 501. There can be two receiving channels 501, as depicted in FIG. 6, or there can be one receiving channel that runs the length of the base 101. The receiving channels 501 are preferably as wide as, or wider than, the flexible strap 102.

The handle 100, via the bottom of the base 101, can be strongly secured to the electronic device 103 with a strong, semi-permanent, double-sided adhesive backer that covers a significant portion of the bottom surface of the base 101. The base 101 can also adhere to the backside of any protective case or other solid surface using the adhesive backer.

The adhesive backer can be a strong, yet removable, adhesive like the VHB family of tapes or other similar adhesives. It can be a high bond adhesive, yet be removable without damage to the device 103, its case, or the base 101. To improve adhesion, the adhesive may match the shape of the bottom of the base 101. However, in some embodiments, the adhesive may cover only a portion of the bottom of the base 101. Further, the adhesive may be one piece of material or may be comprised of several pieces of adhesive material. In other embodiments, the handle 100 may be attached by physically engaging an electronic device's protective case or tensioned via buckle, snaps, or by expanding the length of the base 101.

In one embodiment, the bottom of the base 101 may have concave recesses 601 at one or both ends of the bottom of the base 101, as illustrated in FIG. 6. The combination of the adhesive and the concave recesses 601 creates a suction pressure to help adhere the base 101 to electronic devices 103. This suction can help secure the base 101 to device backs that may be difficult for adhesive alone to firmly bond to such as, but not limited to, glass and surfaces with oleophobic coatings.

In another embodiment of the current invention, the base 101 can contain an embedded or surface magnet 602, as depicted in FIG. 6. The magnet 602 can assist in positioning and aligning the handle 100 for engagement with a mounting apparatus or with another solid surface. The base 101 may further have one or more receiving mortises 301 to securely interface with a mounting apparatus. In another embodiment, the base 101 may contain embedded circuitry, such as RFID, NFC, or other sensors or microelectronic chips, to enable the handle 100 to communicate with other devices, act as a bio-monitoring device, or activate lights. The base 101 may be comprised of clear plastic material allowing any lights in the base 101 to be viewable or to show graphics printed on the bottom of the base 101.

In one embodiment of the current invention, the base 101 may be rigid and may be comprised of plastic, metal, wood, or any other rigid material. In other embodiments, the base 101 may be semi-rigid or even flexible. If the base 101 is flexible, it can be made from, for example, neoprene or rubber. The rigidity of the base 101 provides a strong surface for dispersing the tension of the flexible strap 102 over a larger area. This dispersal of tension increases tensile strength and prevents the adhesive from failing over time. The rigidity of the base 101 further enables the flexible strap 102 to remain taut before and after being applied to the electronic device 103.

In some embodiments, the flexible strap 102 can be made of an elastic fabric material, though it may be comprised of rubber or a similar elastomeric material. In the case of rubber, the flexible strap 102 could provide additional friction for secure handling of an electronic device 103. The flexible strap 102 can be stretchable enough to allow a user's fingers to be inserted between the flexible strap 102 and the base 101 for easier holding and control of the electronic device 103 to which the handle 100 is attached. The flexible strap 102 can be permanently or removably secured to the base 101 at both ends and attached in such a way that it is held taut against the base 101. In some embodiments, the flexible strap 102 is a circular loop of fabric. The flexible strap 102 may be printed upon with text or graphics in some embodiments. The width of the flexible strap 102 may vary. In a preferred embodiment, the flexible strap 102 will be wider than the narrow portion of the base 101 and narrower than the ends of the base 101. The flexible strap 102 may have a loop, button hole, or grommet to attach lanyards or trinkets.

Figure 7:
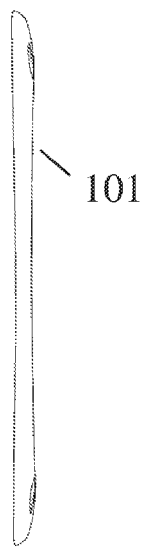
FIG. 7 is a side view of an elongated base.
Figure 8:
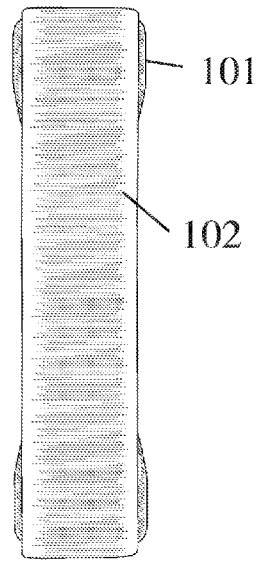
FIG. 8 is a top view of the elongated base of FIG. 7 with a flexible strap attached.

FIGS. 7 through 10 illustrate an elongated form of the handle 100. More specifically, FIG. 7 illustrates a side view of an elongated base 101, and FIG. 8 illustrates a top view of the elongated base 101 with an elongated flexible strap 102 attached.

Figure 9:
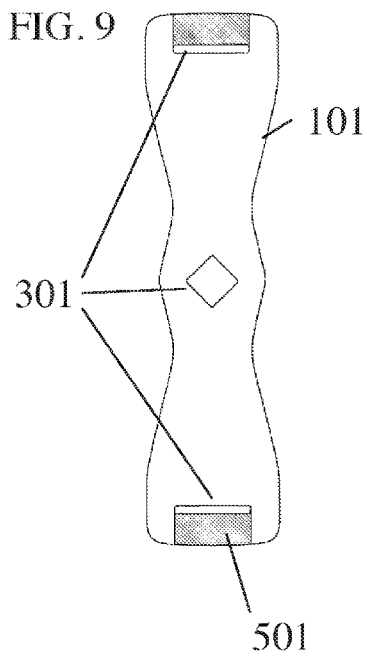
FIG. 9 is a bottom view of the elongated base of FIG. 7 with the flexible strap attached in channels at both ends.
Figure 10:
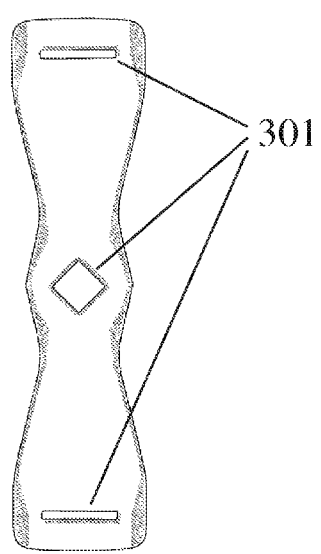
FIG. 10 is a top view of the elongated base of FIG. 7 without the flexible strap attached and with recesses for receiving the protrusions of a mount faceplate.

In one embodiment, as illustrated in FIGS. 9 and 10, the base 101 can include mortises 301 at the ends and in the middle of the base 101. FIGS. 9 and 10 illustrate a bottom view and a top view, respectively, of the base 101 with mortises 301 at the ends and in the middle of the base 101 where the mortises 301 create a pass-through in the base 101. In FIG. 9, the base 101 is attached to the flexible strap 102 through the channels 501. In FIG. 10, the mortises 301 are shown on the top of the base 101 and no flexible strap 102 is attached.

In some embodiments, the disclosed invention further includes a complementary mounting system to the handle 100, wherein the mounting system interfaces directly with the flexible strap 102 and base 101 and enables the user to secure the electronic device 103 to the mounting system for hands-free usage. The mounting surface can, in turn, secure to another surface or structure, such as a car dashboard or bicycle handle. Disclosed herein are several embodiments of mounting systems.

In one embodiment, the mounting system can be comprised of a complementary mount faceplate 1100 that interacts with the handle 100 and electronic device 103 and an attachment apparatus 1302. The attachment apparatus 1302 can securely fasten the mount faceplate 1100 to a variety of surfaces and structures such as, but not limited to, selfie sticks, bicycle handlebars, automobile dashboards, cup holders, or air vents. The mount faceplate 1100 can interface with the flexible strap 102 and base 101, providing a simple and secure method of storage for electronic devices 103.

Figure 11:
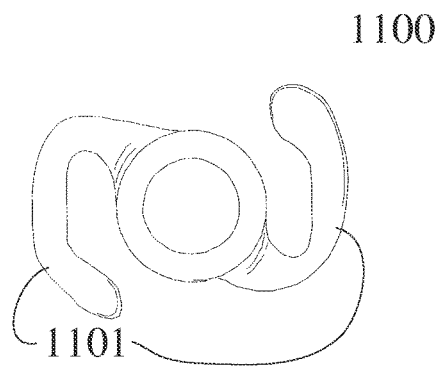
FIG. 11 is a bottom view of a mount faceplate apparatus according to one embodiment of the present invention.
Figure 12:
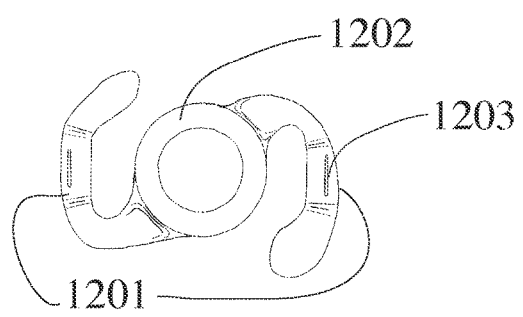
FIG. 12 is a top view of the mount faceplate apparatus of FIG. 11 according to one embodiment of the present invention.
Figure 13:
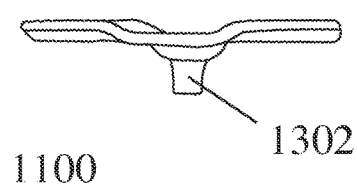
FIG. 13 is a side view of the mount faceplate of FIG. 11 according to one embodiment of the present invention.
Figure 14:
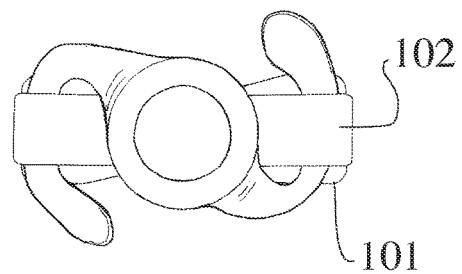
FIG. 14 illustrates the handle of FIG. 1 connected to the mount faceplate of FIG. 11 according to one embodiment of the present invention.
Figure 15:
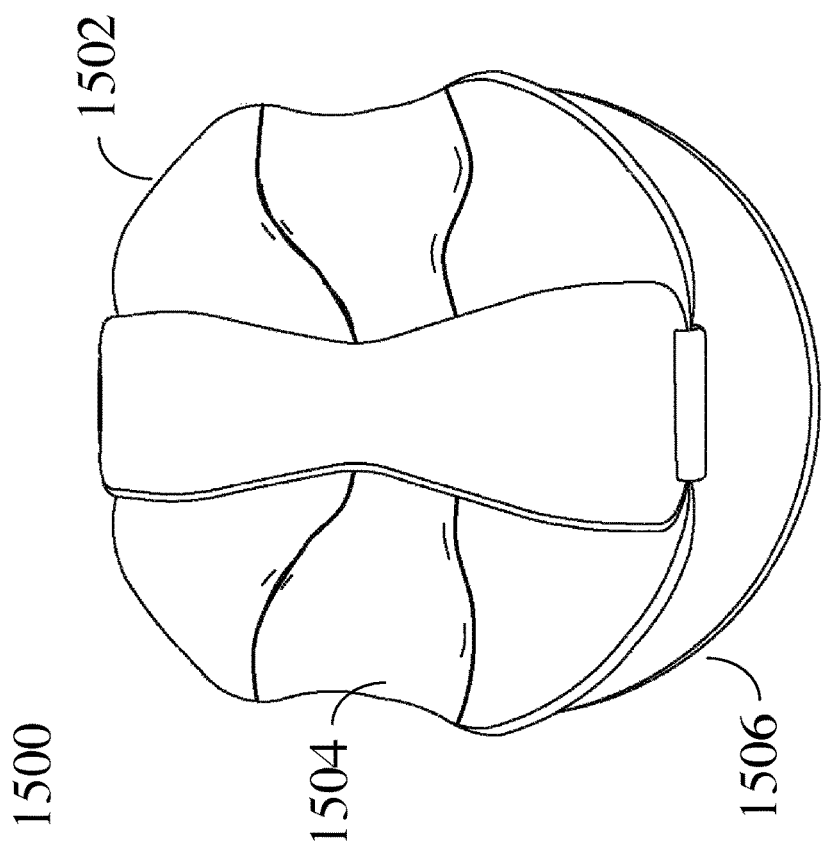
FIG. 15 is a top view of one embodiment of the mount faceplate of the present invention with the handle engaged.
Figure 16:
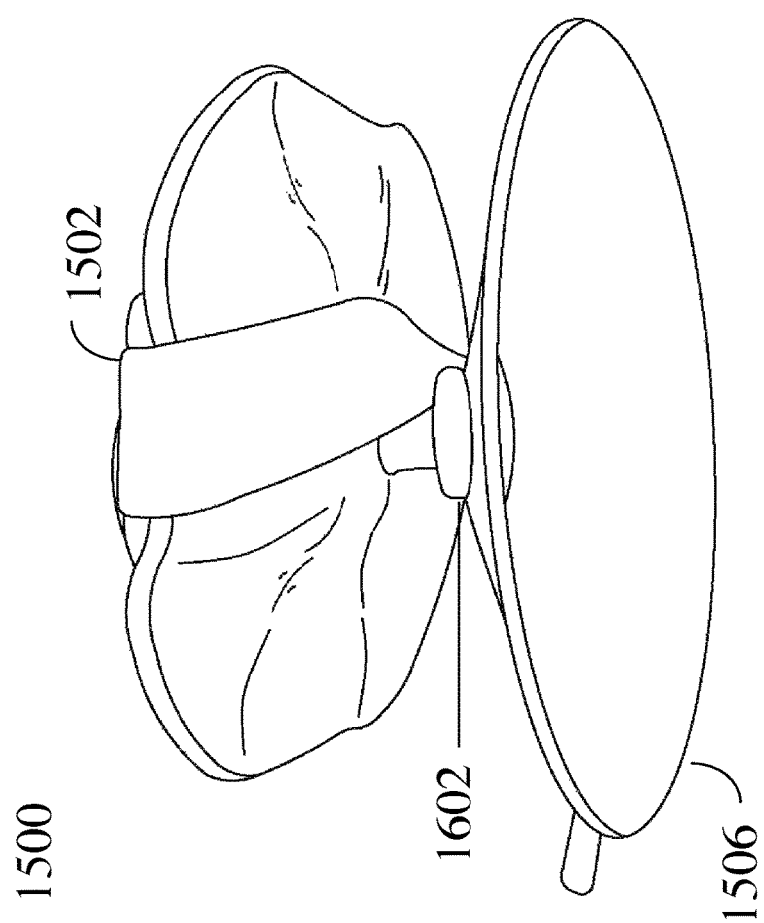
FIG. 16 is a bottom perspective view of one embodiment of the mount faceplate of the present invention with the handle engaged.

FIGS. 11-14 illustrate one embodiment of a complementary mount faceplate 1100. In this embodiment, the mount faceplate 1100 is comprised of a central hub 1202 and two arms 1101, as illustrated in FIGS. 11 and 12, wherein FIG. 11 illustrates the top of the mount faceplate 1100 and FIG. 12 illustrates the bottom of the mount faceplate 1100. More specifically, in one embodiment of the invention, the mount faceplate 1100 has two counter spiraling arms 1101 that extend from a central hub 1202 and that are shaped to fit the contour of the base 101, as illustrated in FIG. 14. The arms 1101 of the mount faceplate 1100 can be spaced apart such that the flexible strap 102 fits between the arms 1101 when engaging the handle 100 with the mount faceplate 1100.

To secure the handle 100 to the mount faceplate 1100, the handle 100 can slide on to the mount faceplate 1100 or align with the mount faceplate 1100 and rotate 90 degrees to interlock with the mount faceplate 1100. As the handle 100 rotates, the arms 1101 can slide between the flexible strap 102 and base 101 and enable the handle 100 and the mount faceplate 1100 to take a locked position. The elasticity of the flexible strap 102 holds the arms 1101 tight to the base 101. Further, there are recesses 1201 on the bottom of each arm 1101 that complement and receive the base 101 when it is fully rotated into locking position. The recesses 1201 can be inset such that the back of the attached electronic device 103 comes into contact with the mount faceplate 1100 when fully engaged. In some embodiments, each arm 1101 may also have a protruding tenon 1203 that fits into a mortise 301 of the base 101 to provide further stability when engaged and to securely hold and align the handle 100 and the attached electronic device 103.

In some embodiments, the central hub 1202 has at its center a magnet that assists in aligning a handle 100 having a magnet 602 with the mount faceplate 1100 so that the user may feel the correct alignment position without having to closely observe the procedure. The bottom of the central hub 1202 can have an attachment apparatus 1302 that securely fastens the mount faceplate 1100 to a variety of adaptors, which can, in turn, connect to various surfaces and structures. The adaptors may attach to a solid surface, article of clothing, vehicle interior, handbag, or luggage, among other things.

In another embodiment, the mount faceplate 1100 is comprised of a singular arm that extends from a central hub 1202. In this arrangement, the handle 100 can slide on to the mount faceplate 1100 from one direction to nest in a recess 1201 on the singular arm. The singular arm can be shaped to easily fit in the gap created by the base 101 and flexible strap 102 by having an edge radius that is less than half of the distance of the gap. In some embodiments, the singular arm can be shaped to receive the narrow portion of the base 101 when inserted between the flexible strap 102 and the base 101. In other embodiments, the singular arm can be shaped to receive a portion of the base 101 such the base 101 nests into the arm. The singular arm may have a magnet located at the receiving portion to assist in the tactile locating of the mount faceplate 1100 and to assist in securing the handle 100 to the mount faceplate 1100. The singular arm version of the mount faceplate can also have an attachment apparatus that can attach to a variety of adaptors of standard design.

Figure 17:
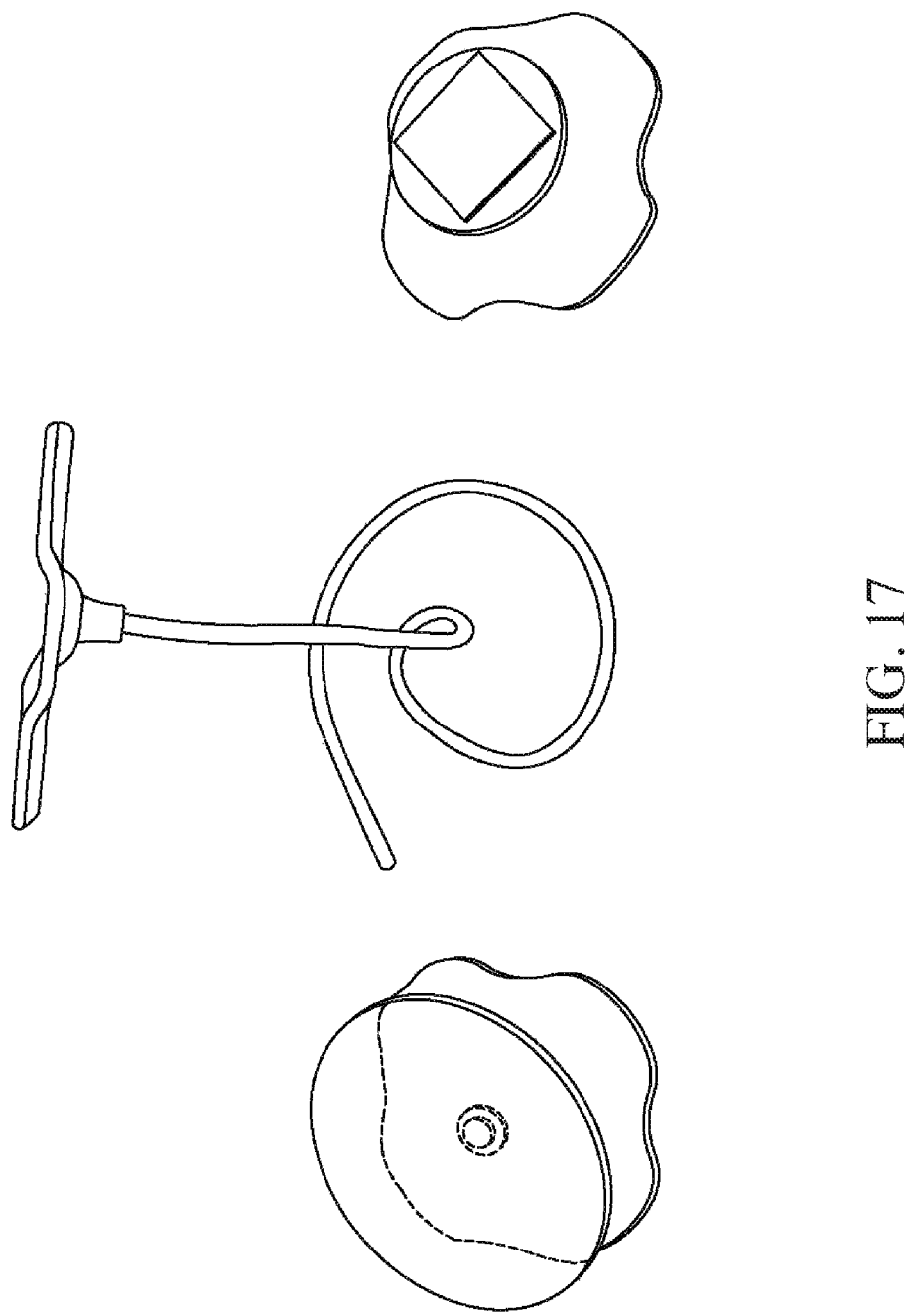
FIG. 17 illustrates one embodiment of the mount faceplate of the present invention with three backer options.
Figure 18:
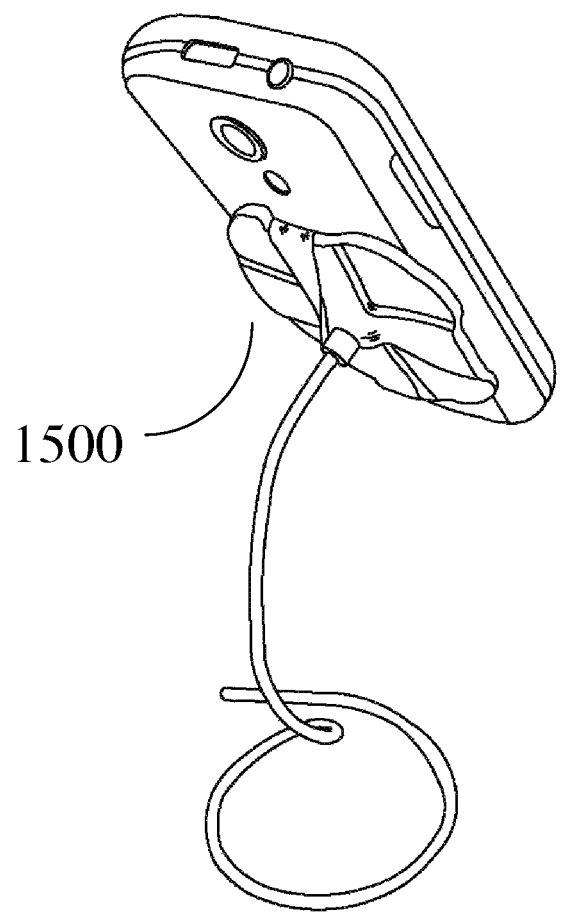
FIG. 18 illustrates one embodiment of the handle and mount of the present invention in use with an electronic device.
Figure 21:
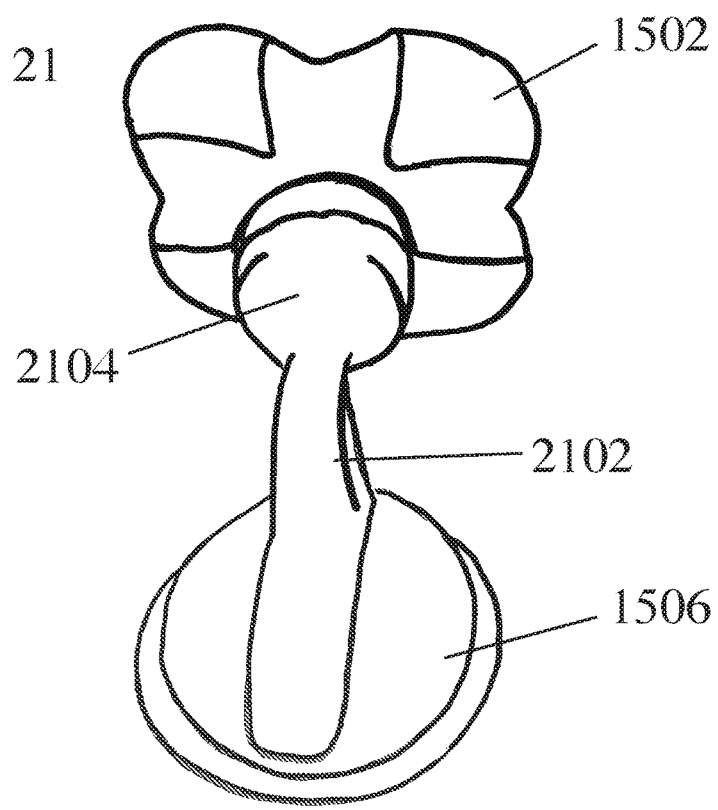
FIG. 21 illustrates one embodiment of the mount faceplate of FIG. 15 attached to a stem and surface attachment system.

Referring now to FIGS. 15 through 22, several similar embodiments of a complementary mount 1500 for securing an electronic device 103 to a surface is shown. The mount 1500 interfaces with the flexible strap 102 and base 101. The mount 1500 includes a mount faceplate 1502, a stem 2102 that allows for positioning, and a surface attachment system 1506. As illustrated in FIG. 21, the mount faceplate 1502 may attach to the stem 2102 with a center rivet 1602 that allows for a variety of stems 2102 and surface attachment systems 1506 or a molded fitting 2104 that allows the mount faceplate 1502 to be positioned. More specifically, the mount faceplate 1502 can attach to the stem 2102, which can, in turn, attach to the surface attachment system 1506. FIG. 17 illustrates one embodiment of the mount faceplate of the present invention with three backer options.

The mount faceplate 1502 can be rigid. It may be made from, or include in its construction, plastic, wood, metal, leather, rubber, or synthetic or other material. The top of the mount faceplate 1502 may include one or more pads to keep the electronic device in place. The pads can be located at the corners of the mount faceplate 1502. They can be made of rubber or any other material with a surface that inhibits movement or creates friction between the mount and attached electronic device 103. The pads can be circular in shape and relatively flat. Alternatively, the pads can be any other shape such as a square, rectangle, oval, triangle, diamond, pentagon, hexagon, trapezoid, etc. Further, the mount faceplate 1502 may be magnetic in that it contains a magnet or is made of metal and capable of attaching to a magnetic surface.

Figure 19:
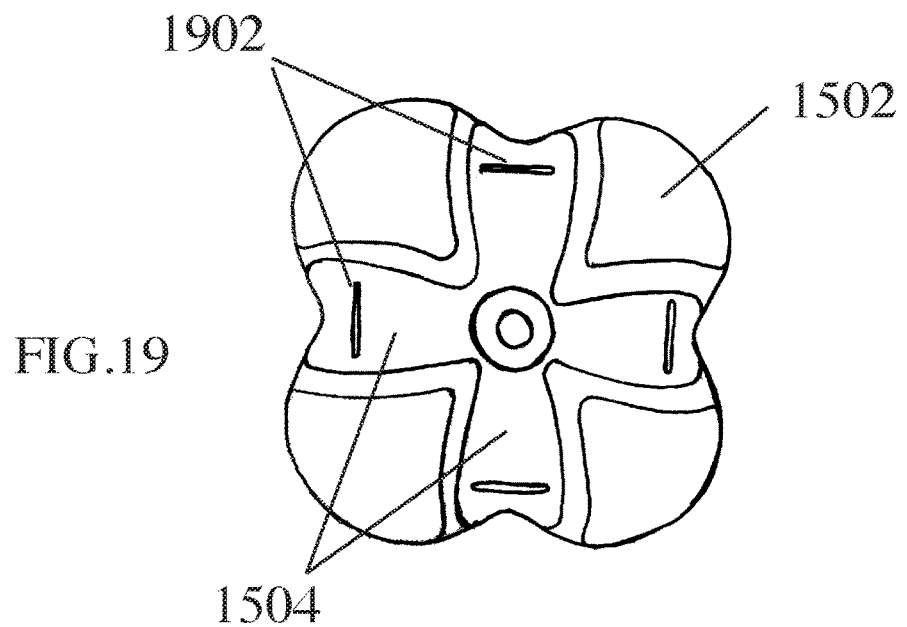
FIG. 19 is a top view of one embodiment of the mount faceplate with recesses and protrusions.
Figure 20:
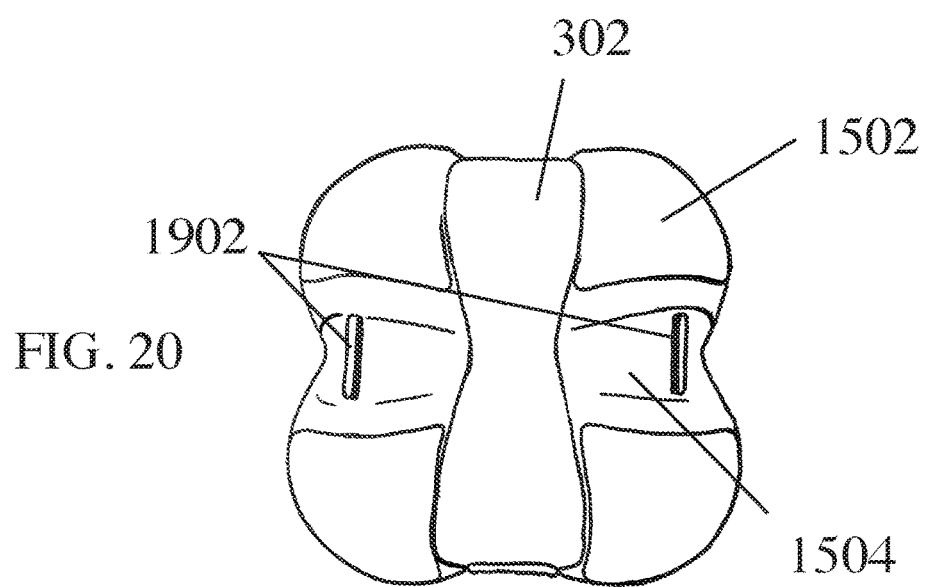
FIG. 20 illustrates the handle of FIG. 1 connected to the mount faceplate of FIG. 15 according to one embodiment of the present invention.
Figure 22:
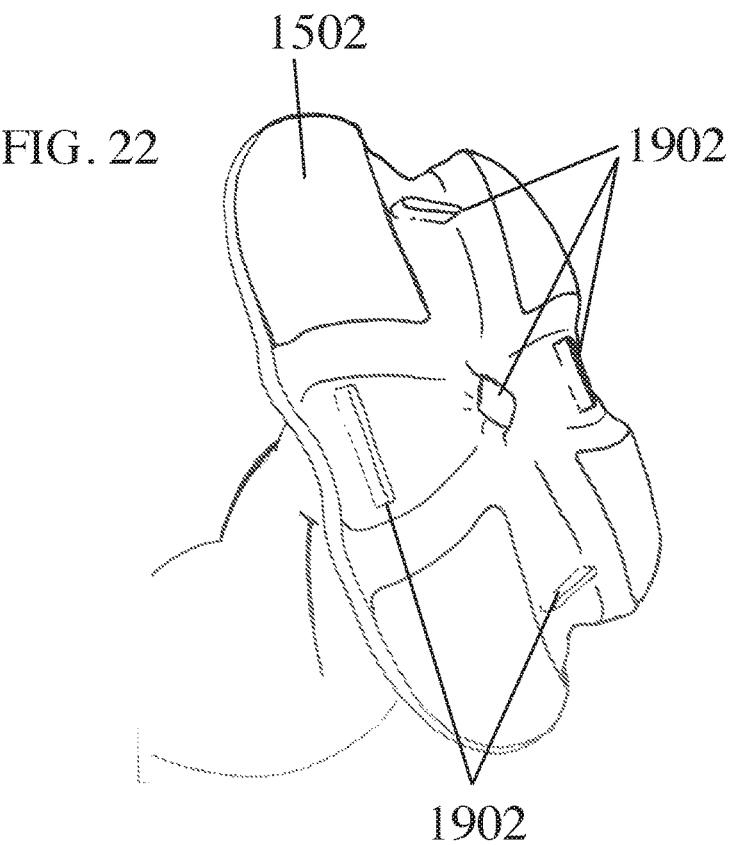
FIG. 22 illustrates the mount faceplate of FIG. 15 with various protrusions for aligning and securing the base.

The mount faceplate 1502 can have two concave recesses 1504 that take the shape of the whole base 101 or a portion of the base 101. The concave recesses 1504 may vary in dimension and placement depending on the shape of the base 101. The concave recesses 1504 can be placed perpendicular to one another to accommodate holding an electronic device 103 in either landscape or portrait orientation. The mount faceplate 1502 can have protrusions or tenons 1902 within the concave recesses 1504 that fit securely in mortises 301 on the base 101 to securely hold and align the attached electronic device 103. The tenons 1902 may be a variety of shapes and positions as illustrated in FIG. 22. FIG. 19 illustrates one embodiment of the faceplate with recesses 1504 and tenons 1902.

Referring to FIGS. 15, 16, 18, and 20 the mount faceplate 1502 can receive the handle 100 when the base 101 is aligned into the concave recesses 1504 and the tenons 1902 in the mount faceplate 1502 are "keyed" in to the mortises 301 in the base 101. In some embodiments, the concave recesses 1504 are at their widest toward the outside of the mount faceplate 1502 and narrow as they near the center. In some embodiments, the center of the top of the mount faceplate 1502 can be recessed, solid, and contain no holes or cutouts while other portions of the concave recesses 1504 can contain holes or cutouts. When the base 101 is aligned against the mount faceplate 1502, the flexible strap 102 can wrap around the bottom of the mount faceplate 1502 and align against the stem 2102 in the center of the mount faceplate 1502, holding the electronic device 103 in place.

The mount faceplate 1502 at the point of the recesses 1504 can be equal to or slightly less than the length of the base 101. The mount faceplate 1502 can be secured to its stem 2102 and surface attachment system 1506 with sufficient height to enable the securing of an electronic device 103 at a usable angle. The stem 2102 can be semi-flexible, wherein it can be bent into different angles or directions and can hold the angle or direction into which it is bent. The surface attachment system 1506 may include, but is not limited to, surface attachment means such as suction means (for example, one or more suction cups), a solid surface with high bond adhesive tape, flexible wire or armature, VEL- CRO, or magnets. The surface attachment system 1506 can be designed to mount to a wall or any flat surface.

In some embodiments, the surface attachment means can be affixed to a rigid or semi-rigid portion of the surface attachment system 1506. The rigid or semi-rigid part of the surface attachment system 1506, in some embodiments, can contain a locking mechanism that functions in tandem with suction cups. For example, a part of the rigid or semi-rigid portion can be rotated or twisted to create suction means. In some embodiments, the suction cup can attach directly to a flat surface. In other embodiments, the suction cup can be paired with an object such as, but not limited to, a polyethylene foam component that has an adhesive on one side and that is flat on at least an upper-facing side to pair with the suction cup. Therefore, the polyethylene foam component can adhere to a surface, the suction cup can be placed on the polyethylene foam component, and the locking mechanism can be engaged to create the suction that adheres the surface attachment system 1506 to a surface.

In some embodiments, the stem 2102 can attach to the surface attachment system 1506 via a hinge. The hinge can permit the stem 2102 to pivot back and forth so a user can change the height of an attached electronic device 103 on the mount faceplate 1502. In some embodiments, a user can pivot the stem 2102 by grabbing it directly and moving it back and forth. In other embodiments, a user can pivot the stem 2102 by using a knob connected to the hinge.

The stem 2102 can attach to the mount faceplate 1502 via a ball joint, wherein the ball is attached to the end of the stem 2102 opposite the hinge. A housing that receives the ball can be attached to the bottom side of the mount faceplate 1502, wherefore permitting the mount faceplate 1502 to freely rotate around the stem 2102.

In some embodiments, the mount 1500 is contoured to attach to a computer case or the case of a tablet computer or e-book reader or similarly flat-screened device. The mount 1500 may also be shaped to attach to a musical instrument, bicycle, or tool. The mount 1500 may also attach to objects via magnets, VELCRO, snaps, adhesive strip, hooks, bolt and nut, screw, or any other means of attachment. The mount 1500 may employ rubber or other high friction material in order to securely hold an electronic device 103.

Referring now to FIGS. 23-31, a complementary mount 2300 for securing an electronic device 103 to a surface or object is shown. In some embodiments, the top of the complementary mount 2300 may have a roughly dome-like shape and the complementary mount 2300 may be made of a rigid material, such as, but not limited to, plastic, wood, metal, rubber, ceramic, or other rigid material or combination.

Figure 23:
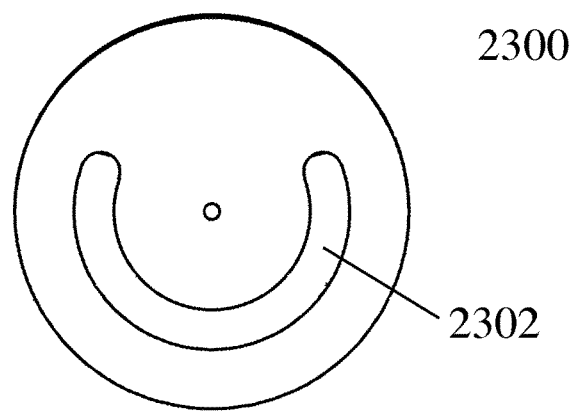
FIG. 23 is a top view of one embodiment of a complementary mount.
Figure 24:
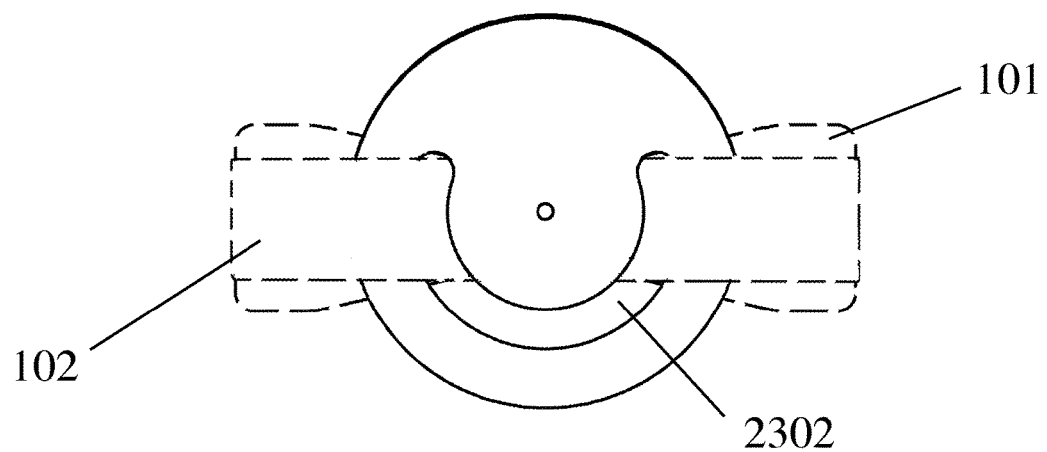
FIG. 24 is a top view of the complementary mount of FIG. 23 with the handle engaged.
Figure 29:
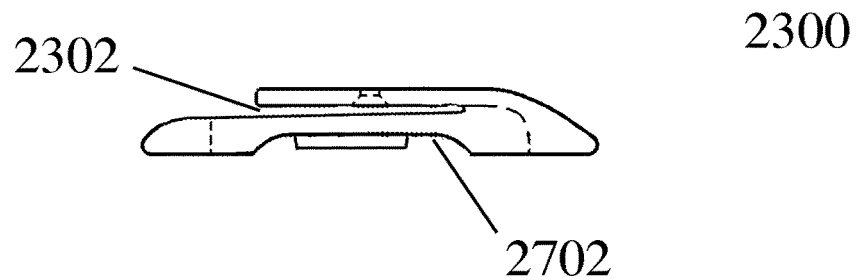
FIG. 29 is a right side view of the complementary mount of FIG. 23.
Figure 30:
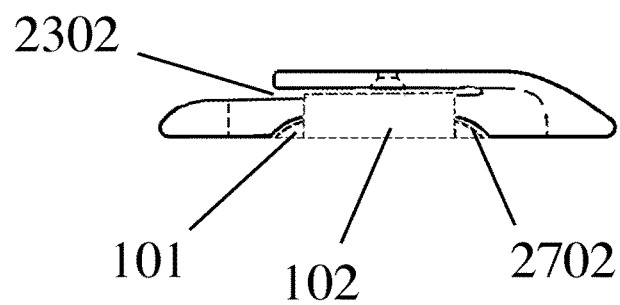
FIG. 30 is a right side view of the complementary mount of FIG. 23 with the handle engaged.
Figure 31:
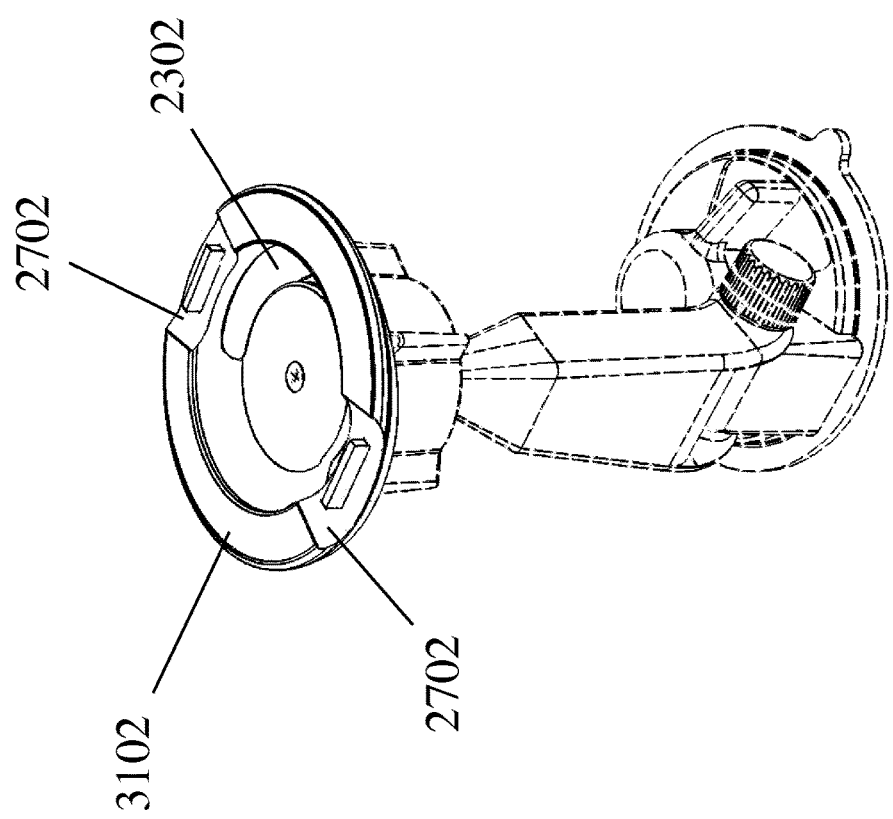
FIG. 31 is a bottom ride side perspective view of the complementary mount of FIG. 23 attached to a suction base.

FIGS. 23 and 24 illustrate a top view of one embodiment of the complementary mount 2300, wherein the top of the complementary mount 2300 is roughly dome shaped. In some embodiments, the apex of the dome can have a small hole in it that enables a user to attach the complementary mount 2300 to objects such as suction stands, bicycle handle bars, musical instruments, or selfie sticks by inserting a screw through the hole and securing the screw to the object, as illustrated in FIG. 31. In some embodiments, the top of the complementary mount 2300 can have an opening, or slot 2302, for the flexible strap 102. The slot 2302 can have an opening that is the shape of an arc and can be deep enough to receive the entire width of the flexible strap 102. For example, the slot 2302 can be a cavity underneath the top of the complementary mount 2300. Therefore, the top of the complementary mount 2300 can be an overhang, as illustrated in FIGS. 29 and 30.

In some embodiments, the flexible strap 102, after sliding into the slot 2302, can rest between the top and the bottom of the complementary mount 2300. In other embodiments, the complementary mount 2300 is hollow, as illustrated in FIG. 31, and the flexible strap 102, after sliding into the slot 2302, can rest underneath the top of the complementary mount 2300 and the portion of the strap that slides into the slot 2302 and sits under the underhang can be visible from the bottom of the complementary base 2300. In some embodiments, the slot 2302 has a large enough curvature that the flexible strap 102 is not bent or stretched to its side when it is secured to the complementary mount 2300, as illustrated in FIGS. 24 and 30.

Figure 25:
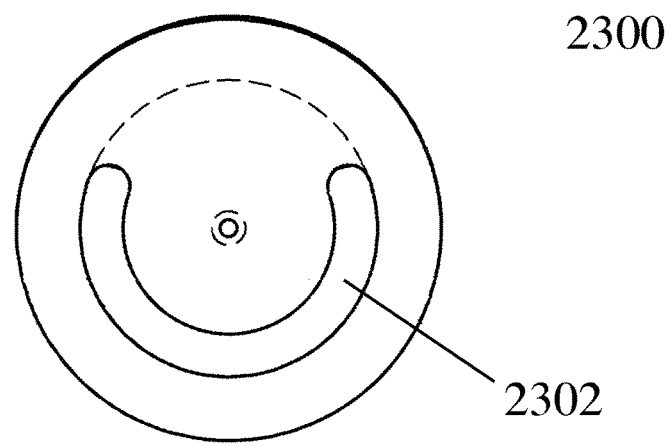
FIG. 25 is a bottom view of the complementary mount of FIG. 23.
Figure 26:
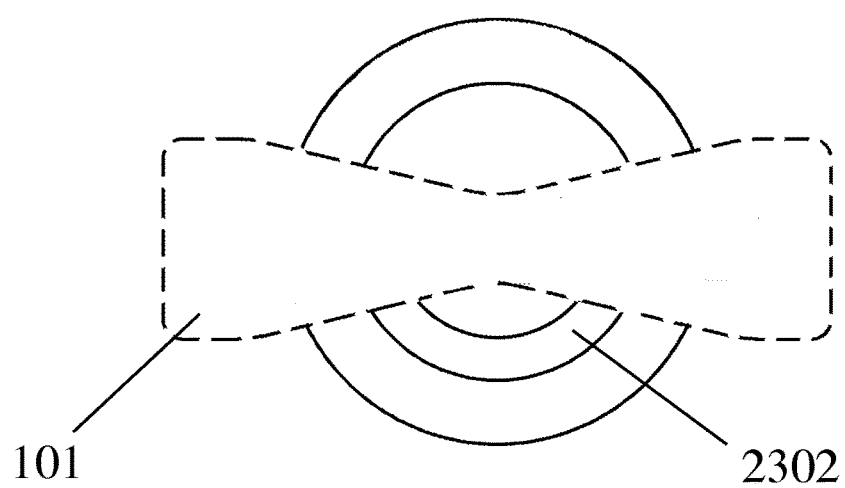
FIG. 26 is a bottom view of the complementary mount of FIG. 23 with the handle engaged.

FIGS. 25 and 26 illustrate a bottom view of one embodiment of the complementary mount 2300. The bottom of the complementary mount 2300 can securely receive the base 101. For example, the bottom of the complementary mount 2300 can be flat or, if the complementary mount 2300 is hollow, the bottom can be an annular lip and, in order to more securely attach the handle 100 to the complementary mount 2300, the bottom can have a recess or two or more recesses 2702 in the shape of all or part of the base 101 so the sides of the base 101 are contained with the complementary mount 2300. More specifically, if the complementary mount 2300 is flat, its bottom can have a recess 2702 that corresponds to the shape of the portion of the base 101 with which it is in contact. If the complementary mount 2300 is hollow, its bottom can have two recesses 1702 located across from each other on the annular bottom lip, as illustrated in FIG. 31. Further, to more securely hold the handle 100, the bottom of the complementary mount 2300 can have a friction surface 3102, such as rubber or other high friction surface material, that creates friction with an electronic device 103. The high friction surface 3102 can cover the entire bottom of the complementary mount 2300 or it can cover specific portions of the bottom. For example, as illustrated in FIG. 31, the high friction surface 3102 can be strips of high friction material added to the flat, annular lip.

Figure 27:
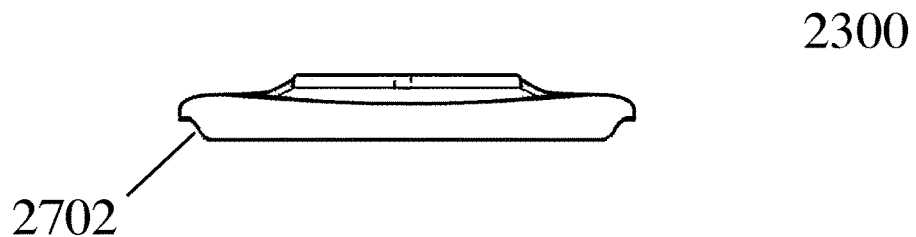
FIG. 27 is a front view of the complementary mount of FIG. 23.
Figure 28:
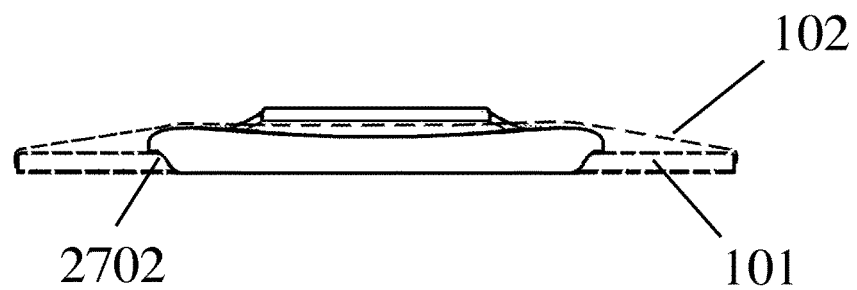
FIG. 28 is a front view of the complementary mount of FIG. 23 with the handle engaged.

FIGS. 27 and 28 illustrated a front view of the complementary mount 2300, wherein the front opening of the slot 2302 is visible and the recess or recesses 2702 are visible. As illustrated in FIG. 29, a right side view of the complementary mount 2300, a preferred embodiment of the complementary mount 2300 has a recess or recesses 2702 on the left and right sides of the complementary mount 2300 and a slot opening facing the front of the complementary mount 2300. This enables a user to easily slide the handle 100 onto the complementary mount 2300 without twisting or turning the flexible strap 102. The flexible strap 102 can slide into the slot 2302 through the front opening and can, once inserted, protrude out the left and right sides of the slot 2302 and align with the base 101 that is protruding out the left and right sides of the bottom of the complementary mount 2300, as illustrated in FIGS. 28 and 30.

In an embodiment without the slot 2302, the complementary mount can maintain a dome-shaped top and flat bottom and can receive the handle 100 by sliding between the base 101 and the flexible strap 102. For example, the complementary mount may have a diameter approximately equal to the length of the base and, because of its dome-like shape, it can pull the flexible strap 102 away from the base 101 on its edges where it is narrow. This enables the mount faceplate to easily slide between the base 101 and flexible strap 102 until the recess on the flat bottom lines up with the base 101. Once these two components line up, the base 101 can nestle into the recess.

The recess may vary in dimension and placement depending on the shape of the base 101. In some embodiments, the mount faceplate may have two recesses, each in the shape of the base, and they may be placed perpendicular to one another to accommodate holding an electronic device 103 in either landscape or portrait orientation.

To further secure the handle 100 to the mount faceplate after the handle 100 is nestled in the recess, the mount faceplate can include protruding tenons that fit securely into the base's mortises 301. The tenons may be of a variety of shapes and positions, depending on the shapes and positions of the base's mortises 301. The complementary mount can also include a magnet or can be made of metal so that a magnet in the base 101, or a base 101 made of metal, can secure more thoroughly to the complementary mount. In a preferred embodiment, a magnet 602 in the base 101 will align with a magnet in the complementary mount. In addition to employing tenons/mortises and magnets, the complementary mount can include a surface material that is rubber or another high friction material in order to create surface friction with the electronic device 103. The high friction surface material can coat the entire mount faceplate, just the surface in contact with the electronic device 103, or any combination of surface areas.

In some embodiments, as with the embodiment containing a slot 2302, the complimentary mount can attach to a complementary attachment apparatus that securely fastens the mount faceplate to a variety of surfaces and structures such as, but not limited to, selfie sticks, bicycle handle bars, automobile dashboards, cup holders, or air vents. For example, a hole through the top of the dome may enable a user to fasten the complementary mount to an attachment apparatus by using a screw.

What is claimed is:

1. A mounting system for a handheld electronic device comprising:
    a dome-shaped mount configured to interface with a handle apparatus attached to an electronic device, the handle apparatus having a base and a flexible strap, and the dome-shaped mount having a flat, rigid top, a bottom, a front, a back, a right side, a left side, and a slot for receiving the flexible strap of the handle apparatus, wherein:
        the bottom of the dome-shaped mount is an annular lip having a flat face and at least two recesses that receive the base of the handle apparatus, wherein the base is substantially flush with the flat face and each recess of the annular lip has a tenon that interfaces with corresponding mortises on the base of the handle apparatus; and
        the slot of the dome-shaped mount is a cavity created between the flat, rigid top and the bottom of the dome-shaped mount, the slot having a front opening to accept a portion of the flexible strap of the handle apparatus; and
        the dome-shaped mount is tapered toward the front.

2. The mounting system of claim 1, wherein the flat, rigid top connects to the bottom at the back of the dome-shaped mount, enabling the slot of the dome-shaped mount to be arc shaped and to extend from the front of the dome-shaped mount through the right side and left side of the dome-shaped mount.

3. The mounting system of claim 2, wherein the annular lip of the bottom of the dome-shaped mount includes a high friction surface material.

4. The mounting system of claim 3, wherein the flat, rigid top of the dome-shaped mount has a hole in its center.

5. The mounting system of claim 4, wherein the at least two recesses of the annular lip of the dome-shaped mount each contain a magnet.

6. A mounting system for a handheld electronic device comprising:
    a handle apparatus having a rigid base and a flexible strap that runs along a front surface of the rigid base; and
    a dome-shaped, complementary mount that interfaces with the handle apparatus, the complementary mount having a flat top, a bottom, a front, a back, a right side, a left side, and a slot for receiving the flexible strap of the handle apparatus, wherein:
        the bottom of the complementary mount has a flat face; and
        the slot of the complementary mount is a cavity created between the flat top and the bottom of the complementary mount; and
        the complementary mount is tapered toward the front.

7. The mounting system of claim 6, wherein the flat face of the bottom of the complementary mount has at least two recesses that receive the rigid base of the handle apparatus.

8. The mounting system of claim 7, wherein the rigid base of the handle apparatus is substantially flush with the flat face of the bottom of the complementary mount.

9. The mounting system of claim 6, wherein the rigid base of the handle apparatus has a first end, a midpoint, a second end, a front surface, a back surface, and a tapered periphery.

10. The mounting system of claim 9, wherein the rigid base of the handle apparatus has a first receiving mortise near the first end and a second receiving mortise near the second end, and wherein the flat face of the bottom of the complementary mount has at least two recesses that receive the rigid base of the handle apparatus, wherein each of the two recesses of the complementary mount has a tenon that interfaces with the first receiving mortise or the second receiving mortise of the rigid base.

11. The mounting system of claim 9, wherein:
    the rigid base of the handle apparatus has a first receiving channel on the back surface near the first end and a second receiving channel on the back surface near the second end; and
    the flexible strap of the handle apparatus has a first end secured to the first receiving channel of the rigid base of the handle apparatus, has a second end secured to the second receiving channel of the rigid base of the handle apparatus, and is comprised of an elastic material.

12. The mounting system of claim 9, wherein the first end and the second end of the rigid base of the handle apparatus are wider than the midpoint of the rigid base of the handle apparatus, the first end and the second end of the rigid base of the handle apparatus encompass the full width of the flexible strap of the handle apparatus, and the flexible strap is wider than the midpoint of the rigid base of the handle apparatus.

13. The mounting system of claim 6, wherein the flat top of the complementary mount is substantially circular in shape.

14. The mounting system of claim 13, wherein the bottom of the complementary mount is substantially circular in shape.

15. The mounting system of claim 14, wherein a circumference of the flat top of the complementary mount is smaller than a circumference of the bottom of the complementary mount.

16. The mounting system of claim 15, wherein the bottom of the complementary mount is an annular lip and the complementary mount is hollow.

17. The mounting system of claim 6, wherein the flat top connects to the bottom of the complementary mount at the back of the complementary mount, and wherein the slot of the complementary mount has a front opening to accept a portion of the flexible strap of the handle apparatus.

18. The mounting system of claim 17, wherein the slot of the complementary mount is configured such that the flexible strap of the handle apparatus remains in line with the rigid base of the handle apparatus.

19. A mounting system for a handheld electronic device comprising:

a handle apparatus having a rigid base, a flexible strap, and an adhesive backer, wherein:

the rigid base has a first end, a midpoint, a second end, a front surface, a back surface, a tapered periphery, a first receiving channel on the back surface near the first end, a second receiving channel on the back surface near the second end, a first receiving mortise near the first end, and a second receiving mortise near the second end;

the flexible strap has a first end secured to the first receiving channel of the rigid base, has a second end secured to the second receiving channel of the rigid base, runs along the front surface of the rigid base, and is comprised of an elastic material; and the adhesive backer covers the back surface of the rigid base; and a hollow, dome-shaped, complementary mount that interfaces with the handle apparatus, the complementary mount having a flat, rigid top, a bottom, a front, a back, a right side, a left side, and a slot for receiving the flexible strap of the handle apparatus, wherein:

the flat, rigid top connects to the bottom at the back of the complementary mount;

the bottom is an annular lip having a flat face that is a high friction surface material, the bottom further having at least two recesses located across from each other that receive the rigid base of the handle apparatus, wherein the rigid base is substantially flush with the flat face of the complementary mount and each recess of the complementary mount has a tenon that interfaces with the first receiving mortise or the second receiving mortise of the rigid base of the handle apparatus;

the slot is a cavity created between the flat, rigid top and the bottom of the complementary mount that extends from the front of the complementary mount through the left and right sides, the slot having a front opening that accepts a portion of the flexible strap of the handle apparatus;

the flexible strap of the handle apparatus protrudes out of the right side and the left side of the complementary mount and remains in line with the base of the handle apparatus; and the complementary mount is tapered toward the front.

20. The mounting system of claim 19, wherein the first end and the second end of the rigid base of the handle apparatus are wider than the midpoint of the rigid base of the handle apparatus, the first end and the second end of the rigid base of the handle apparatus encompass the full width of the flexible strap of the handle apparatus, and the flexible strap is wider than the midpoint of the rigid base of the handle apparatus.

* * * * *